No. 644,917. Patented Mar. 6, 1900.
A. H. HOYT.
ELECTRICAL MEASURING INSTRUMENT.
(Application filed Sept. 22, 1899.)
(No Model.)

Witnesses
A. Ferguson
F. D. Scanlon

Adrian H. Hoyt Inventor
By his Attorney
C. W. Edwards

THE NORRIS PETERS CO., PHOTO-LITHO., WASHINGTON, D. C.

UNITED STATES PATENT OFFICE.

ADRIAN H. HOYT, OF PENACOOK, NEW HAMPSHIRE.

ELECTRICAL MEASURING INSTRUMENT.

SPECIFICATION forming part of Letters Patent No. 644,917, dated March 6, 1900.

Application filed September 22, 1899. Serial No. 731,248. (No model.)

*To all whom it may concern:*

Be it known that I, ADRIAN H. HOYT, a citizen of the United States, residing at Penacook, in the county of Merrimac and State of New Hampshire, have invented certain new and useful Improvements in Measuring Instruments, of which the following is a full, clear, and exact specification.

My invention relates to electrical measuring instruments; and its object is to construct an instrument which shall be simple and economical in construction and shall be highly sensitive to variations of current values in the current to be measured.

A further object to be attained by the invention is to provide means for conveying the actuating-current to the coil without interfering with the mechanical operation of the instrument.

The invention is applicable alike to either voltmeters or ammeters.

In carrying out my invention I propose to employ a movable coil actuated by the current to be measured and movable through a field of force between the poles of a permanent or electro magnet, the extent of movement depending upon the voltage or amperage of the actuating-current, and to provide means for concentrating the lines of force in the field into a relatively-small space and limit the movement of the coil to this space. To obtain any desired range of movement of the indicating-needle upon the scale I employ suitable multiplying devices between the movable coil and the needle.

In instruments heretofore in general use it has been customary to convey the current to the coil through the springs employed to oppose the movement of the coil. This is objectionable in that in order to avoid the heating of the spring which follows, forcing a comparatively-heavy current through a light spring, it has been found necessary to increase the size of the spring considerably beyond the size which would normally perform the retarding or opposing work. I therefore propose to provide independent flexible conductors of low resistance for conveying the current to the coil, and thus be enabled to utilize springs of light construction to perform the opposing work.

The invention comprehends various features of advantage which will more clearly appear hereinafter, and it will be more particularly described with reference to the form thereof illustrated in the accompanying drawings, in which—

Figure 1:
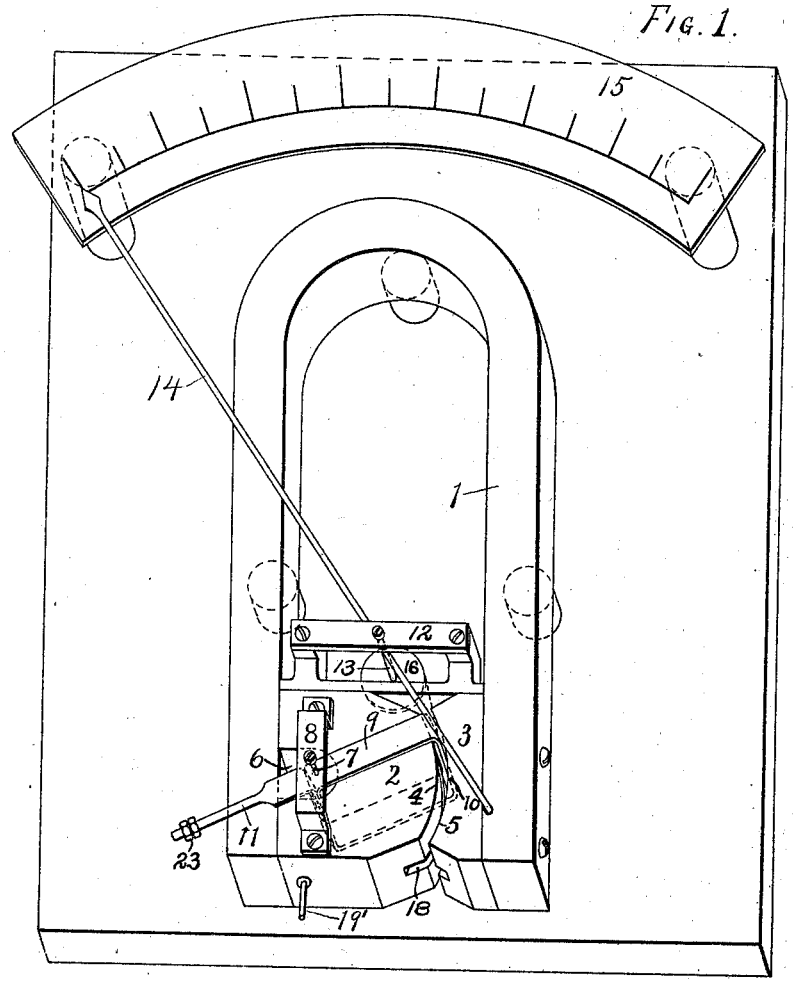
Figure 3:
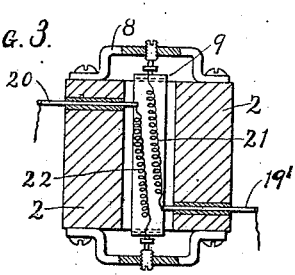
Figure 2:
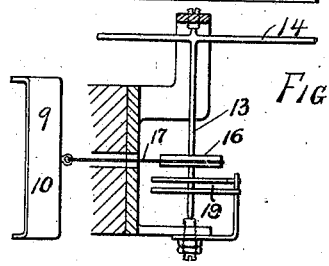

Figure 1 is a perspective view of a measuring instrument embodying the principles of my invention. Fig. 2 is a detail sectional view of the coil and surrounding parts, and Fig. 3 is a detail sectional view illustrating the manner of conveying the current to the coil.

Referring more particularly to the drawings, 1 represents a magnet employed to produce the field of force through which the coil is to be moved. In this instance the magnet employed is a permanent magnet, but if preferred it may be an electromagnet. The poles 2 and 3 of the magnet are provided with tapered ends facing each other and leaving a small air-gap between the same. The end of pole 2 is provided with a convex surface 4, and the pole 3 with a concave surface 5, thus providing a segmental-shaped air-gap between the poles. The length of the air-gap will be adjusted according to the conditions of size of the instrument and work upon which it is to be used; but to produce best results ought to be relatively short in comparison with the width of the pole-pieces, whereby the lines of force passing from one pole-piece to the other will be concentrated into this short air-gap. The pole-piece 2 is provided with a suitable opening 6, through which a suitable shaft 7 extends, the shaft having its bearings in suitable supports 8. Upon the shaft 7 is mounted the coil 9, the latter surrounding the pole-piece 2, as illustrated in the drawings, and having one side extending through the air-gap between the poles 2 and 3, the coil being adapted to swing upon the shaft 7, its side 10 thereupon moving through the path of the air-gap. The coil 9 is made up of wire of suitable fineness and conductivity to adapt the instrument for the use to which it is to be put and will be connected in series with or shunt to the source of current to be measured, according to which the instrument is to be adapted. An extension 11 is fixed to the coil 9 or its shaft 8 and acts as a counterbalance to evenly balance the coil on its shaft. In practice the extension will generally carry an adjustable weight 23.

In a suitable bearing 12 is mounted an axis 13, to one end of which is fixed the indicating-needle 14, which is arranged to swing so that its pointer will move from end to end of the calibrated scale 15. Upon the axis 13 is mounted a roll or cam 16, to which is attached one end of a thin cord 17 or other flexible connection, the other end of the cord being attached to the coil 9. Suitable slots 18 are cut in the pole-pieces 2 and 3 to permit the cord 17 to move freely. A suitable spring or springs 19 is arranged upon the axis 13 to oppose the movement of the coil under the influence of the magnet. The terminals 19' and 20 of the current to be measured pass through the pole-piece 2 into the opening 6, being suitably insulated from the pole-piece, one of the terminals being located at or near one end of the opening 6 and the other terminal being located at or near the other end thereof, substantially as illustrated in Fig. 3. From the terminals 19' and 20 suitably-arranged flexible wires or strips 21 and 22 of conducting material of low resistance respectively extend to the opposite sides of the coil 9, where they are connected to the terminals of the coil.

In operation the lines of force of the magnet between poles 2 and 3 will, as before explained, be concentrated into the short air-gap, and when no current is flowing through the coil 9 the spring 19 will tend to hold the needle in zero position and, through the connection 17, will draw the coil into the position shown in the drawings. When current is introduced into the coil, a force is exerted, according to well-known principles, tending to move the side 10 through the path of the air-gap, swinging the coil upon the shaft 7. By reason of the concentration of the lines of force the action of the coil when current is passed through the same will be more positive than has heretofore been the case. With the increase of current in the coil the force exerted at the magnet-poles to move the coil is increased, and the side 10 of the coil moves in opposition to the spring and draws upon the connection 17, which swings the needle upon its axis. The ratio of the movement of the needle with respect to that of the coil may be regulated by varying the size of the roll 16 and will of course vary according to conditions.

It will be observed that current at no time passes through the spring or springs 19, and therefore the efficiency of the spring will not be in any wise impaired. Furthermore, when the coil swings upon its shaft the conductors 21 and 22 are moved but slightly from their positions and by reason of their flexibility will readily conform to whatever slight change may occur.

Having thus described my invention, I declare that what I claim as new, and desire to secure by Letters Patent, is—

1. In a measuring instrument, the combination of a magnet having tapered pole-pieces, the ends of which face each other, a movable coil having one side adapted to move between said tapered poles, an indicating-needle, and a connection between said coil and said indicating-needle, substantially as described.

2. In a measuring instrument, the combination of a magnet having tapered pole-pieces the ends of which face each other, the surface of one of said poles being convex and the other being concave, a coil pivoted at one side and having its other side adapted to move between said tapered pole-pieces, an indicating-needle and a connection between said coil and said indicating-needle, substantially as described.

3. In a measuring instrument, the combination of a magnet having pole-pieces tapered toward each other, the ends of said pole-pieces having oppositely-disposed convex and concave surfaces respectively, an opening in said convex pole-piece, a coil having one side pivotally mounted in said opening and surrounding said convex pole-piece, the other side of the coil being adapted to move between said pole-pieces, an indicating-needle, and a connection between said coil and said indicating-needle, substantially as described.

4. In an indicating instrument, the combination of a magnet having tapered pole-pieces facing each other, the surface of one of said poles being convex and the other being concave, a coil pivoted at one side and having its other side adapted to move between said poles, a pivotally-mounted indicating-needle, and a multiplying connection between said coil and said indicating-needle, substantially as described.

5. In an indicating instrument, the combination of a magnet having tapered pole-pieces facing each other, the surface of the end of one of said poles being convex and the end of the other being concave, a coil pivoted at one side and having its other side adapted to move between said poles, a pivotally-mounted indicating-needle, a roll fixedly connected with the bearing of said needle, and a flexible connection between the periphery of said roll and the swinging end of said coil, substantially as described.

6. In an indicating instrument, the combination with the magnet, of a pivotally-mounted coil, fixed terminals located adjacent to the pivot of said coil, terminals of said coil carried thereby and located at the respective ends thereof adjacent to the pivots, and flexible conductors connecting each of said fixed terminals with one of the coil-terminals, said conductors extending directly between the respective terminals in a substantially-straight line, substantially as described.

7. In an indicating instrument, the combination with the magnets, of a pivotally-mounted coil, fixed terminals located adjacent to the pivots of said coil, terminals of said coil carried thereby and located adjacent to the respective ends thereof, and flexible conductors connecting said fixed terminals with the coil-terminals, each of said conductors leading from its fixed terminal at one side of the shaft to the coil-terminal located at the opposite end of the shaft, the conductors being substantially parallel to the shaft of said coil, substantially as described.

8. In an electrical measuring instrument, the combination of a shaft in fixed bearing, a coil having one side fixedly mounted on said shaft, its other side being free to rotate about said shaft as an axis, a field of force influencing said moving side of the coil, an indicating-needle, a connection between said needle and said coil, fixed terminals of the current to be measured located at the respective ends of said shaft, and flexible conductors of low resistance connecting said fixed terminals with terminals of the coil, each of said conductors leading from its fixed terminal at one side of the shaft to that part of the coil adjacent to the opposite end of the shaft, the conductors being substantially parallel to the coil-shaft, substantially as described.

In testimony whereof I affix my signature in presence of two witnesses.

ADRIAN H. HOYT.

Witnesses:
DAVID F. DUDLEY,
BLANCHE L. DUDLEY.